United States Patent
Steele et al.

(10) Patent No.: US 12,044,231 B2
(45) Date of Patent: Jul. 23, 2024

(54) ARTICULATED PLUNGER ROD PUMP

(71) Applicant: CLEANTEK INDUSTRIES INC., Calgary (CA)

(72) Inventors: Geoff Steele, Edmonton (CA); Eric Laing, Edmonton (CA)

(73) Assignee: CLEANTEK INDUSTRIES INC., Calgary (CA)

( * ) Notice: Subject to any disclaimer, the term of this patent is extended or adjusted under 35 U.S.C. 154(b) by 211 days.

(21) Appl. No.: 16/491,518

(22) PCT Filed: Aug. 3, 2018

(86) PCT No.: PCT/CA2018/050956
§ 371 (c)(1),
(2) Date: Sep. 5, 2019

(87) PCT Pub. No.: WO2020/024038
PCT Pub. Date: Feb. 6, 2020

(65) Prior Publication Data
US 2021/0332814 A1    Oct. 28, 2021

(51) Int. Cl.
| F04B 47/12 | (2006.01) |
| F04B 53/14 | (2006.01) |
| F16J 1/00  | (2006.01) |
| F16J 1/22  | (2006.01) |

(52) U.S. Cl.
CPC ............ *F04B 47/12* (2013.01); *F04B 53/143* (2013.01); *F04B 53/144* (2013.01); *F16J 1/005* (2013.01); *F16J 1/22* (2013.01)

(58) Field of Classification Search
CPC ...... F04B 53/144; F04B 47/12; F04B 47/026; F04B 19/003; F04B 53/22; F04B 39/14; F04B 39/0005; F04B 39/0016; F04B 39/0022; F04B 53/146; F04B 53/147; F04B 53/14; F04B 53/122; F04B 53/143;
(Continued)

(56) References Cited

U.S. PATENT DOCUMENTS

| 2,010,587 A | * | 8/1935 | Fisher | .................... | E21B 17/04 |
| | | | | | 464/19 |
| 2,687,024 A | * | 8/1954 | George | .................. | F16D 3/207 |
| | | | | | 464/112 |

(Continued)

FOREIGN PATENT DOCUMENTS

WO    WO2015/196287    12/2015

OTHER PUBLICATIONS

International Search Report in International Application No. PCT/CA2018/050956, dated Sep. 18, 2018.
(Continued)

*Primary Examiner* — Bryan M Lettman
(74) *Attorney, Agent, or Firm* — Greenblum & Bernstein, P.L.C.

(57) ABSTRACT

A reciprocating rod pump apparatus includes a pump barrel having an inner bore and a plunger disposed within the pump barrel. The plunger includes a plurality of plunger segments. The reciprocating rod pump apparatus further includes an articulating connector disposed between and connecting plunger segments. The articulating connector is adapted to allow for deflection between plunger segments.

11 Claims, 3 Drawing Sheets

(58) Field of Classification Search
CPC .... F16J 1/22; F16J 1/005; E21B 17/20; E21B 43/127
See application file for complete search history.

(56) References Cited

U.S. PATENT DOCUMENTS

| | | | | | |
|---|---|---|---|---|---|
| 3,442,181 | A | * | 5/1969 | Olderaan | F04B 1/2078 91/500 |
| 4,329,124 | A | * | 5/1982 | Pridy | F04B 47/026 166/242.6 |
| 5,154,532 | A | * | 10/1992 | Schaefer | F04B 53/147 403/301 |
| 5,201,639 | A | * | 4/1993 | Reineck | F04B 53/127 417/236 |
| 5,372,488 | A | * | 12/1994 | Turner | E21B 43/127 277/336 |
| 5,752,814 | A | * | 5/1998 | Starks | F04B 53/126 417/554 |
| 7,713,035 | B2 | * | 5/2010 | Ford | F04B 53/20 417/430 |
| 10,329,886 | B2 | | 6/2019 | Steele et al. | |
| 2007/0022874 | A1 | * | 2/2007 | Townsend | B25B 27/0028 92/128 |
| 2008/0112826 | A1 | * | 5/2008 | Ford | F04B 47/026 417/430 |
| 2018/0073305 | A1 | * | 3/2018 | Downing | E21B 17/1071 |
| 2019/0376600 | A1 | * | 12/2019 | Ford | F16J 1/22 |

OTHER PUBLICATIONS

Written Opinion in International Application No. PCT/CA2018/050956, dated Sep. 18, 2018.
Raise Production Inc., "HALS & Horizontal Well Pumping Systems—Client Presentation". Jun. 22, 2017 (Jun. 22, 2017), pp. 1-14, [online] [retrieved on Aug. 17, 2018 (Aug. 17, 2018)]. Retrieved from the Internet: <http://raiseproduction.com/images/PDFs/Raise_HALS Horizontal_Well_Pumping_System_june_22nd_2017.pdf>.

* cited by examiner

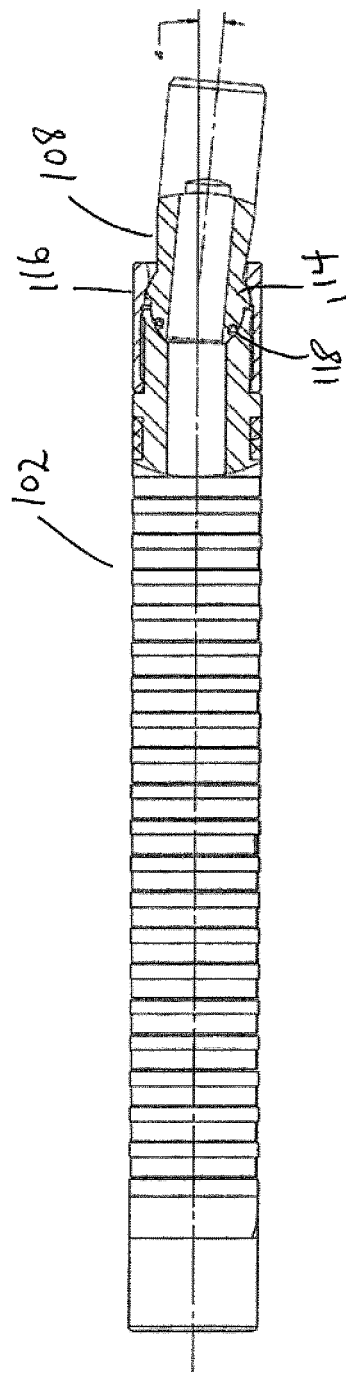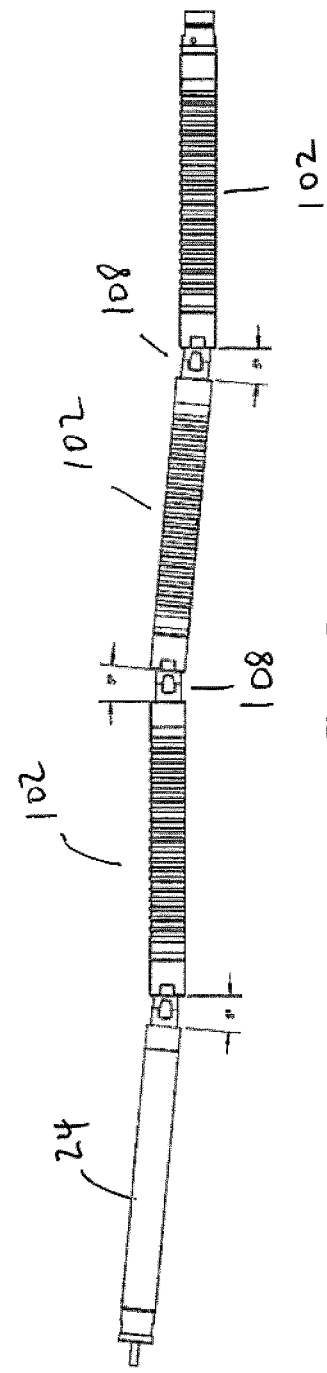
Figure 4
Figure 5

_(1)_
ARTICULATED PLUNGER ROD PUMP

FIELD OF THE INVENTION

The present invention relates to reciprocating rod pumps.

BACKGROUND

Horizontal well drilling has been a significant development in the evolution of the tools and techniques to lift reservoir products to the surface. However, horizontal well drilling continues to pose significant challenges associated with producing oil and gas to surface. These methods are analogous in many ways to creating a pipeline located several hundred meters below the surface of the earth. While in pipeline flow/production operations there are booster pumps and compressor stations strategically located along the line in order to aid movement of the product along the line, such flow enhancements are not available downhole. Intervention techniques such as pipeline pigging are also available to assist in surface pipeline productivity. None of these techniques are available or practical for use in the production of horizontal oil wells.

In conventional rod pumping activities, it is well known that rod and tubing wear associated with reciprocating rod pumps can lead to premature failure of a rod pumping system. Excessive tubing wear can also lead to costly well workovers and high operating costs. All this is well known in vertical rod pumping systems and is more relevant in high angle rod pump applications. The challenges of pumping at high angles and solutions to those challenges are not well understood to date.

To efficiently produce the horizontal wellbores, operators continually require deeper landing depths and higher angles for their rod pump systems. This ensures that the back pressure residing against the formation is minimal and the well is produced in a "pumped-off" state at all times. Drilling activities of these wells to accommodate pump landing depths may incorporate a tangent section where the build rates of the horizontal remains constant and therefore creates a "straight" deviated section of wellbore in which the rod pump is landed and can reciprocate. As reservoir pressure declines, the rod pump landing depth is moved downward, chasing the declining fluid level. This often results in pumps being landed beyond the end of the tangent section in the wellbore, in a section where there may be large build rates. Operation of a conventional rod pump at high angle build rates beyond the tangent segment of the wellbore can result in substantial wear to the components of the rod pumping system. Numerous components can suffer the effects of this type of application including, but not limited to the pump barrel, plunger, valve rod, or plunger seals.

When landed in a high angle section, the stiffness of the plunger in comparison to that of the barrel can lead to the barrel deflection being substantial enough that the plunger will not easily pass through the barrel, causing exaggerated rod loads, particularly on the upward stroke of the pump. This exaggerated loading condition will lead to a high stress due to bending residing in the valve rod at the terminal top end of the rod pump. This condition can result in the plunger becoming stuck in the pump barrel and the valve rod ultimately failing and parting near the rod pump top or within the pump barrel.

Therefore, there is a need in the art for modified rod pumps which may mitigate at least some of the difficulties in the prior art.

SUMMARY OF THE INVENTION

The present invention relates to a downhole rod pump system and more particularly an improvement to a rod pump system for more efficient operation in high angle conditions, such as below a conventional tangent section leading into the substantially horizontal portion of said wellbore. The system may be deployed in conjunction with conventional, unconventional or enhanced oil recovery techniques such as steam-assisted gravity drainage, miscible flood, or steam (continuous or cyclic), gas or water injection.

Embodiments of the system and method of the present invention may also be used in offshore operations, including configurations where the well head is located on the sea floor bed.

Therefore, in one aspect, the invention may comprise a reciprocating rod pump apparatus comprising:
(a) a pump barrel having an inner bore;
(b) a plunger comprising at least two plunger segments; and
(c) an articulating connector disposed between and connecting the at least two plunger segments, adapted to allow for deflection between the at least two plunger segments.

In one embodiment, each plunger segment may define at least one circumferential seal for sealing between the plunger segment and the pump barrel inner bore. Preferably, the seal is an elastomeric O-shaped ring which resides in a sealing groove which extends around the circumference of the plunger segment.

In one embodiment, the articulating connector is rigidly connected to at least one of the plunger segments, such as by a threaded connection, and connected to the other of the at least two plunger segments by a connection which allows movement in three rotational degrees of freedom, such as a ball and socket connection.

In another aspect, the invention may comprise an articulating joint between a rod string and a valve rod, the joint comprising a swivel sub attached to the valve rod and a retaining collar attached to the rod string, wherein the swivel sub is retained by the retaining collar but may freely rotate and pivot within the collar.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 4 is a partial section view showing a ball and socket articulating connector in a deflected position.

FIG. 5 displays a plunger having 3 segments deflecting in a working state.

DETAILED DESCRIPTION

The present invention relates to an articulated plunger for use in a rod pump comprising a pump barrel, which may be used in circumstances resulting in high angle conditions, which may result in relatively large deflections of the pump barrel. The articulated plunger has at least one, and preferably multiple deflection points along its length.

The claimed invention described herein comprises specific embodiments of a rod pump system which may be configured to suit many different wellbore configurations and fluid compositions. As described herein, the term "longitudinal" or "axial" refers to a direction, axis or plane parallel to the longitudinal center axis of the pump assembly. The term "transverse" or "radial" refers to a direction, axis or plane which is perpendicular to the longitudinal direction, axis or plane. The terms "up", "above", "down" or "below" (or the like) are used for convenience to refer to the relative configuration of components when the pump assembly is viewed in a vertical configuration, but is not intended to limit the use of the pump assembly vertically or at any deviated angle.

Figure 1:
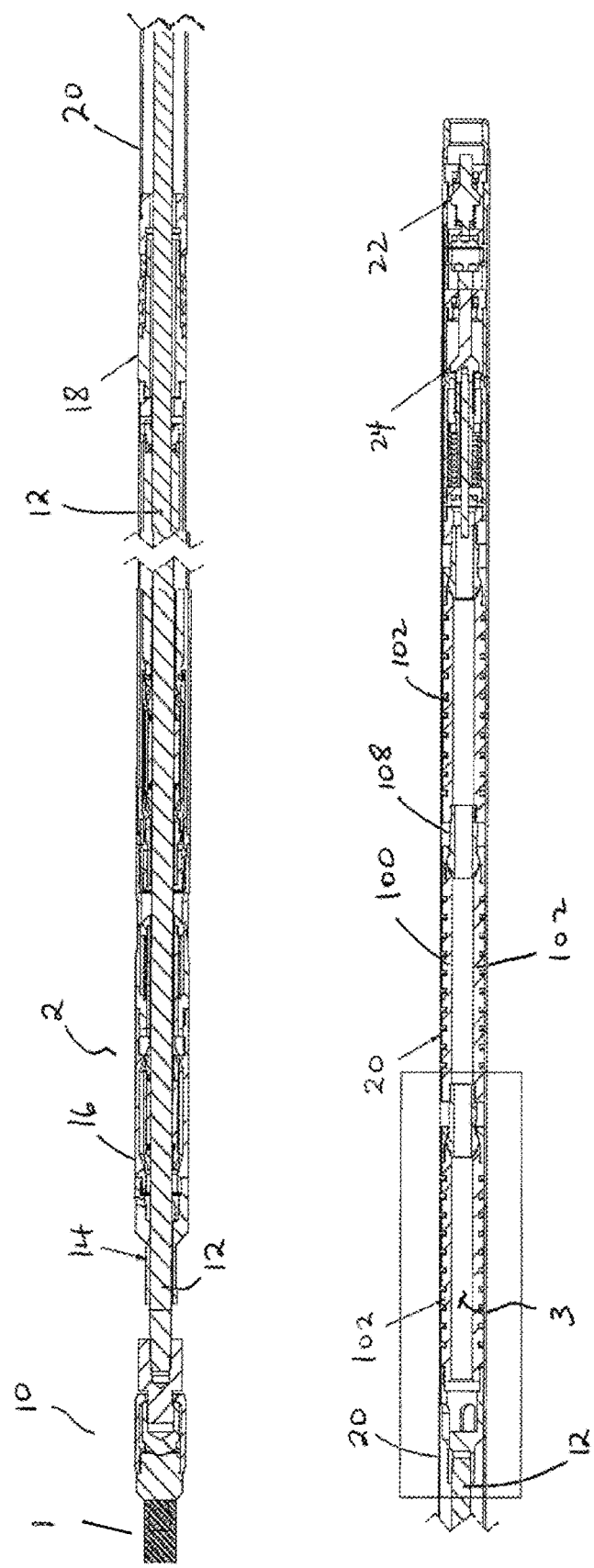
FIG. 1 shows a cross-sectional view of a rod pump assembly of the present invention.

In one aspect, the invention may comprise elements of a rod pump system as shown in FIG. 1. In one embodiment, an upper portion of the pump assembly includes a top articulated joint (10) connected between the rod string (1) and the valve rod (12). The valve rod (12) extends downward through the rod pump top guide (14) and the upper housing (16). The upper portion of the rod pump may include a sliding valve assembly (2), as described in PCT Application No. PCT/CA2015/050585, entitled "Rod Pump System", the entire contents of which are incorporated herein by reference, where permitted.

A seating cup assembly (18) is attached to the upper housing (16) and includes seating cups which land the rod pump into a pump seating nipple (not shown) as is well-known in the art. The pump barrel (20) extends downwards from the seating cup assembly and terminates at the lower end of the rod pump with a standing valve assembly (22).

In some embodiments, the upper portion of the rod pump may also include a bushed barrel assembly for centralizing and guiding the valve rod (12) as it enters and exits the pump barrel (20). Such an assembly is also described in PCT application number PCT/CA2015/050585.

The valve rod (12) attaches to a plunger (100) which reciprocates within the pump barrel (20). The plunger (100) is attached at its bottom end to a traveling valve assembly (24). The standing valve and traveling valve assemblies (22, 24) may comprise any standing or traveling valve assemblies, or may comprise the valve configurations described in PCT/CA2015/050585.

As is well known in the art, the plunger (100) is bored through end-to-end to allow flow of production fluids through from the pump barrel (20) below the travelling valve (24) to the plunger bore (3) above the travelling valve.

The plunger (100) is articulated, meaning that it is capable of bending slightly along its length to accommodate deflection in the pump barrel (20). In one embodiment, the articulated plunger (100) comprises at least two plunger segments (102), joined in a manner which permits some deflection between two adjacent segments, and which tolerates the forces transmitted through the plunger (100). As used herein, "deflection" means that the longitudinal, central axes of adjacent plunger segments are not co-axial and parallel, but rather a small angle is created between the two axes. Accordingly, an articulating connector (108) is disposed between and attached to the at least two plunger segments, and permits at least one deflection point relative to one or both of the at least two plunger segments. In embodiments, this articulating connector (108) may provide up to about 5° of deflection between adjacent plunger segments.

In some embodiments, at least one segment, and preferably each segment, is configured to restrict the annular space between the plunger segment and the inner surface of the pump barrel. This restriction may be provided by ring seals or a close tolerance between the outer surface of the plunger segment and the pump barrel. In some embodiments, at least one segment defines at least one circumferential groove (104) housing a seal (106) for sealingly and slidably engaging the pump barrel bore. Preferably, each plunger segment (102) defines a plurality of seal grooves (104) each housing a fluid-energized seal (106). The seal need not be an O-ring to be a fluid-tight seal; small gaps when installed may be tolerated, so long as there is significant resistance to fluid flow around and past the plunger (100).

As a result of having a plurality of such seals, the seal between the plunger segment and the pump barrel provides sufficient resistance to fluid movement that it is suitable for this application. On the plunger downstroke, production fluid below the traveling valve should be forced into the production path within the plunger segments, and not leak out between the plunger and the pump barrel. The overall sealing ability produced by the multiple seal grooves and seals is designed to incorporate the equivalent seal area length as is well known in the art.

Other plunger finishes as are well known in the art may be utilized in this design. For example, spray metal, chrome plating, nitriding, or other advanced materials such as nickel based alloys, stainless steel, etc. may be employed. Any combination of plunger type and finish considered suitable by those skilled in the art may also be utilized.

Figure 2:
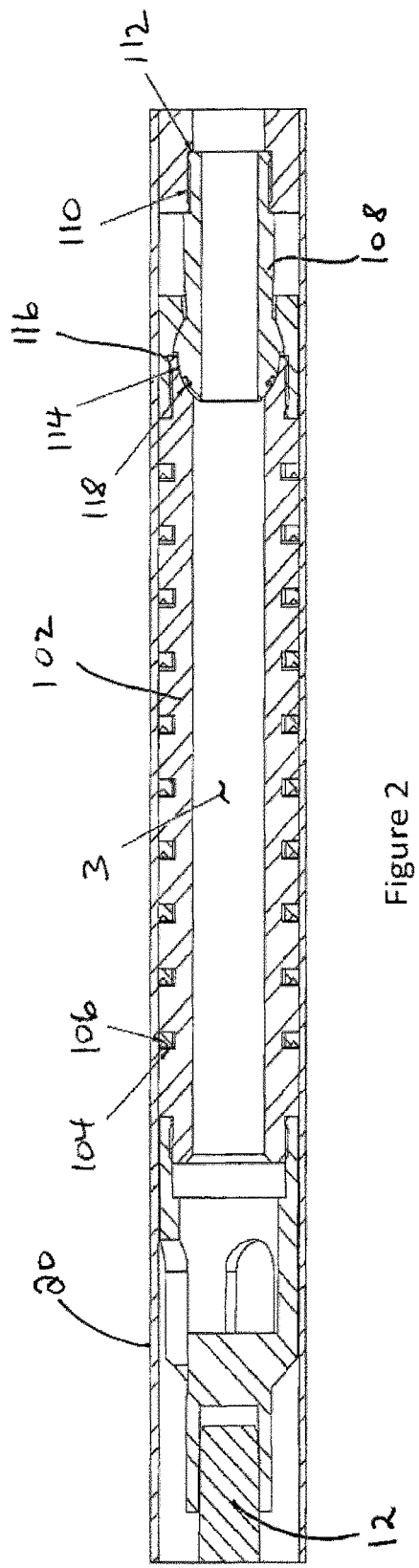
FIG. 2 is a detailed view of box D in FIG. 1.
Figure 3:
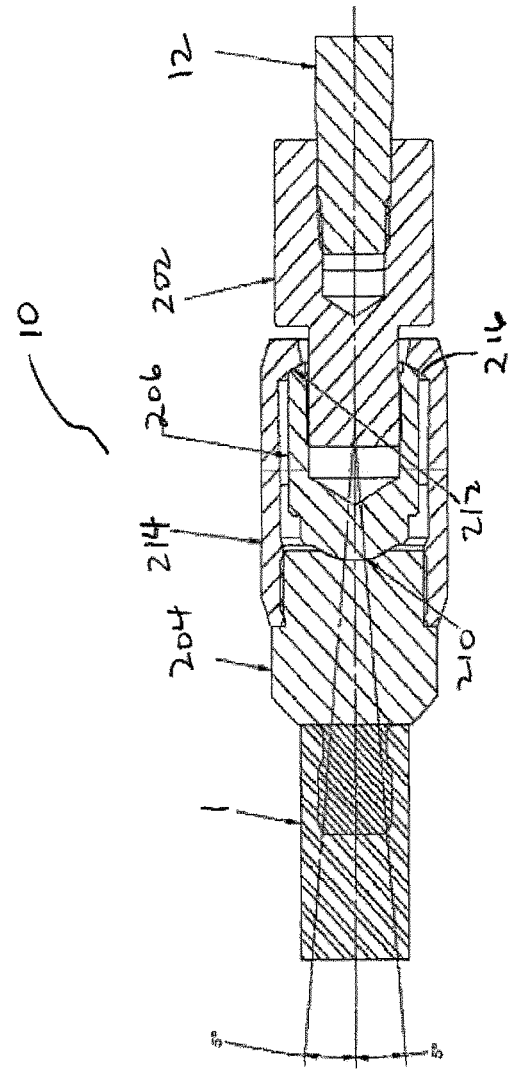
FIG. 3 is a detailed view of box C in FIG. 1.

The articulating connector (108) is hollow to allow passage of production fluids, and sealed to contain those fluids, but otherwise may take different forms. In one embodiment, as shown in FIG. 2, one end of each articulating connector (108) is fixed to a plunger segment with a straight close tolerance threaded connection (110) abutting an external shoulder (112) creating a metal-on-metal seal face. The other end of the articulating connector is connected to the adjacent plunger segment by a ball (114) and socket connection. The socket is created by a collar (116) which is threaded on to the plunger segment, which collar has an internal face, and by the lower end of the plunger segment, which also defines a face. The face of the collar and plunger segment create a spherical socket which contains the ball (114) and allows it to rotate, allowing the desired deflection. A seal (118), such as an O-ring, may be provided between the ball and the socket to provide a seal and to prevent fine solids from infiltrating the socket. Alternatively, a polished metal-on-metal surface seal may be used. A secondary metal seal is formed in the socket by the external abutment metal-on-metal shoulder between the collar and the plunger segment and secondly between the internal shoulder on the collar and the lower face of the ball.

The upper end of the plunger (100) attaches to the lower end of the valve rod (12) in a conventional fashion.

In some embodiments, the rod pump system may comprise a top articulating joint (10) which connects between the bottom of the rod string (1) and the top of the valve rod (12). The top articulating joint (10) allows for deflection between the rod string and the valve rod, and also swivels to allow free rotation of the rod string without rotating the valve rod. This functionality may reduce stresses due to bending on the upstroke of the rod string at the top face of the fixed valve rod guide (14), and help mitigate uneven wear of the rod string centralizers (not shown).

In some embodiments, the articulated joint (10) is equipped with a rod string centralizer (not shown) immediately adjacent to or integral to the joint. The rod bushing (202) is threadingly connected to the reciprocating valve rod (12). The rod sub (204) is threaded into the rod string (1) which extends to the pumping unit on surface. A swivel sub (206) has a crowned upper surface (208) which bears on a lower surface (210) of the rod sub (204). The lower end of the swivel sub (206) is threaded to the rod bushing (202) and has an exposed shoulder (212). A collar (214) rigidly threads onto the rod sub (204) and has a lower lip (216) which retains the swivel sub by bearing on the shoulder (212). The swivel sub may be equipped with a hex head to receive a socket wrench for ease of assembly.

There is sufficient clearance within the collar (214) to allow the swivel sub (206) to pivot slightly in relation to the rod sub (204), while still being retained by the collar lower lip (216). In addition, the swivel sub (206) may freely rotate within the collar (214).

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated. To the extent that the following description is of a specific embodiment or a particular use of the invention, it is intended to be illustrative only, and not limiting of the claimed invention.

The corresponding structures, materials, acts, and equivalents of all means or steps plus functional elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to combine, affect or connect such aspect, feature, structure, or characteristic with other embodiments, whether or not such connection or combination is explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

The invention claimed is:

1. A reciprocating rod pump apparatus comprising:
   a pump barrel having an inner bore;
   a plunger comprising at least two plunger segments, disposed within the pump barrel;
   a rod string;
   a valve rod that extends from outside of the pump barrel to an interior of the pump barrel and connects the rod string to the plunger, the valve rod having a longitudinal axis;
   a first articulating connector disposed between and connecting a first plunger segment and a second plunger segment of the at least two plunger segments, wherein the first articulating connector is adapted to allow for deflection between the first and second plunger segments; and
   a second articulating connector disposed between and connecting the valve rod and the rod string, wherein the second articulating connector is adapted to allow for deflection between the valve rod and the rod string,
   wherein the second articulating connector comprises a swivel sub attached to the valve rod and a retaining collar attached to the rod string, wherein the swivel sub has a rotation axis extending along the longitudinal axis, and the swivel sub is retained by the retaining collar and freely rotatable around the rotation axis and pivotable within the retaining collar.

2. The apparatus of claim 1, wherein the first articulating connector comprises a ball and socket joint.

3. The apparatus of claim 2, wherein the ball and socket joint comprises a ball, a socket, and a seal between the ball and the socket.

4. The apparatus of claim 3, wherein the seal comprises an O-ring.

5. The apparatus of claim 3, wherein the seal comprises a polished metal-on-metal surface.

6. The apparatus of claim 1, wherein at least one plunger segment of the at least two plunger segments comprises an outer seal for sealing between the at least one plunger segment and the pump barrel inner bore.

7. The apparatus of claim 6 wherein the outer seal comprises an elastomeric O-shaped ring which resides in a sealing groove which extends around the at least one plunger segment of the at least two plunger segments.

8. The apparatus of claim 6 wherein the outer seal comprises a metal O-shaped ring which resides in a sealing groove which extends around the at least one plunger segment of the at least two plunger segments.

9. The apparatus of claim 6 wherein each plunger segment of the at least two plunger segments comprises a plurality of outer seals inclusive of said outer seal.

10. The apparatus of claim 6 wherein the outer seal is formed by a tolerance between an outer diameter of the at least one plunger segment and the inner bore of the pump barrel.

11. The apparatus of claim 1, wherein the first articulating connector includes a collar threadedly attached to one of the first plunger segment and the second plunger segment.

\* \* \* \* \*